United States Patent [19]
Gabor et al.

[11] 4,016,470
[45] Apr. 5, 1977

[54] ELECTRICAL CENTERING AND BORING SYSTEM FOR TRANSDUCERS

[75] Inventors: Andrew Gabor, Alamo; Kenneth W. Cocksedge, Pleasanton, both of Calif.

[73] Assignee: Xerox Corporation, Stamford, Conn.

[22] Filed: May 19, 1975

[21] Appl. No.: 578,454

[52] U.S. Cl. .............................. 318/606; 29/271; 33/181 R; 318/653; 408/13; 408/16
[51] Int. Cl.² .................. B23B 49/00; H02K 15/16
[58] Field of Search .......... 318/606, 652, 653, 607, 318/608; 408/1, 2, 13, 16, 69–71; 33/174 Q, 178 F, 181 R; 29/271, 596

[56] References Cited
UNITED STATES PATENTS

| | | | |
|---|---|---|---|
| 2,580,674 | 1/1952 | Griffin | 408/16 X |
| 3,217,568 | 11/1965 | Graffenreid | 408/13 X |
| 3,349,303 | 10/1967 | Burnight et al. | 318/606 |
| 3,798,757 | 3/1974 | Hennessey et al. | 33/181 R |

*Primary Examiner*—Robert J. Hickey
*Attorney, Agent, or Firm*—J. E. Beck; T. J. Anderson; B. P. Smith

[57] ABSTRACT

Method and apparatus for accurately positioning a blank angular position transducer element for boring at its center. A relatively high frequency carrier signal is applied to the blank transducer element to be bored and is thereby induced in a master rotor element which is rotated at a constant speed in an operative relationship with the blank. The rotor is made deliberately eccentric with respect to its axis of rotation, and the induced signal contains a carrier signal, a component indicative of relative angular position, and a once-per-revolution eccentricity error component, if the blank element is also eccentric with respect to the axis of rotation. Error detection circuitry isolates the once-per-revolution eccentricity error component, and resolution circuitry resolves it into $x$ and $y$ directions for application to error display devices, or to actuators connected to move the blank transducer element automatically until the $x$ and $y$ components are both zero. The blank element can then be bored by a tool movable along and rotable about the axis of rotation.

30 Claims, 12 Drawing Figures

ELECTRICAL CENTERING AND BORING SYSTEM FOR TRANSDUCERS

BACKGROUND OF THE INVENTION

This invention relates generally to the manufacture of angular position sensors or transducers, and, more particularly, to a novel technique for accurately center-boring angular position transducer elements.

Angular position transducers are widely used in such electro-mechanical devices as computer-controlled printers, magnetic disk drives, and video recording machines. Basically, such transducers consist of a fixed stator element and a rotatable rotor element mounted in close proximity to each other so that there is electromagnetic or electrostatic coupling between the two elements.

In one common transducer of the electromagnetic type, each element consists of a flat, circular disk, with a number of uniformly spaced, radial, conductive strips formed on an annular region of the disk, the strips being connected in series to form one continuous electrical winding. Typically, but not necessarily, the conductive strips are formed on the disk by a photo-etching process. When a carrier signal, which is usually at radio frequency, is applied to one of the elements, a similar signal is induced in the winding of the other element. More importantly, the induced signal will be amplitude-modulated, i.e., it will vary in amplitude depending on the relative angular position of the rotor and stator. The amplitude will be highest when the radial conductive strips of the two elements are aligned, and lowest when they are furthest out of alignment. Thus, as the rotor is turned, the induced signal is amplitude-modulated at a rate dependent on the angular spacing of the conductive strips. Consequently, the angular position of the rotor element may be determined to a resolution limited only by the incremental angular spacing of the strips.

It will be appreciated from the foregoing that, for the transducers to function in a highly accurate manner, it is essential that the rotor and stator elements both be mounted concentrically with the axis of rotation of the rotor. Moreover, it is preferable to eliminate any possible eccentricity during fabrication of the transducer elements, rather than depending on adjustments during installation, by ensuring that each rotor or stator element is center-bored to a high degree of accuracy. The most common method of center-boring such elements up till now has utilized an optical device to locate the center of each element. While optical methods can be extremely accurate in determining the geometric center of such an element, it is generally the case that the photo-etching or other process of depositing the conductive strips is not highly accurate, and the geometric or optical center may not, therefore, always correspond exactly with what might be termed the "electrical center" of the element.

Accordingly, it is highly desirable to locate and bore the center of each complete transducer element using electrical rather than optical methods. Although the desirability of this objective has been recognized by others in the field, there has long existed, nevertheless, a definite need for an improved, practical and convenient technique for locating and accurately boring the electrical center of a transducer element. The present invention satisfies this need.

SUMMARY OF THE INVENTION

The present invention resides in a novel method and apparatus for locating the electrical center of an angular position transducer element, and boring a hole therethrough so that the element can be mounted concentrically with the axis of relative rotation between a pair of such elements.

Briefly, in accordance with the method of the invention, a blank transducer element to be bored is located in an operative position with respect to a master transducer element, and one of the elements is rotated with respect to the other about an axis of relative rotation. The master element is deliberately eccentric with respect to the axis, and one of the elements is supplied with a high-frequency carrier signal. The carrier signal is induced in the other element, and is processed to detect an error signal indicative of the eccentricity of the blank element. The error signal may then be resolved into two orthogonally related, or $x$ and $y$ error signals, and the blank element may be moved accordingly until the $x$ and $y$ error signals are reduced to zero, indicating that the blank element is concentric with the axis of relative rotation. The blank may then be bored by a tool aligned with the axis.

In a presently preferred embodiment of the invention, the blank element is mounted as a stator, and the master element as a rotor. The carrier signal is then applied to the blank stator element, and is induced in the rotor for subsequent processing and resolution of the eccentricity error signal.

A significant point is that the rotor of the preferred embodiment is deliberately eccentrically mounted with respect to its axis of rotation. If the rotor were mounted concentrically with its axis of rotation, any slight eccentricity of the stator would be practically impossible to detect in the signal induced in the rotor winding. However, when both elements are eccentric with respect to the axis of rotation, even a slight eccentricity of the stator can be detected in the induced rotor signal.

The $x$ and $y$ error signals may be utilized to energize a display or meter to indicate the magnitude of the errors to an operator, who would then move the stator in the $x$ and $y$ directions, in a plane perpendicular to the axis of rotation, until the errors were zero. Alternatively, the $x$ and $y$ error signals may be connected to actuators which automatically move the stator in the $x$ and $y$ directions until the eccentricity errors become zero.

More specifically, the signal induced in the rotor is processed by first demodulating the carrier-frequency signal to obtain an intermediate signal which varies once per position increment of the transducer, and which may have further superimposed upon it an error signal varying once per rotor revolution, the latter being due to the eccentricity of the stator blank. The next step is rectifying this intermediate signal, and then filtering out every signal component except the once-per-revolution error signal.

Resolution of the error signal into $x$ and $y$ components is accomplished in a presently preferred embodiment by detecting the time at which the angular position of maximum eccentricity of the rotor, i.e., the rotor center, passes through an angular reference point; generating sampling pulses at times corresponding to angular positions of the rotor spaced by ninety degrees; sampling the error signal at ninety-degree intervals with respect to the angular reference point;

and deriving $x$ and $y$ error signals from the sampled values.

The apparatus of the invention, in general terms, includes means for holding a blank transducer element and a master transducer element in an operative rotational relationship with each other; means for rotating one element with respect to the other, the master element being deliberately eccentric with respect to the axis of rotation; and means for moving the blank element in $x$ and $y$ directions perpendicular to the axis of rotation. Also included are a carrier-frequency signal generator connectable to one of the elements, and the electrical means for detecting an error signal component in the signal induced in the other element, and for resolving the error signal component into $x$ and $y$ components. Further included are the boring means itself, and either display means, to indicate the $x$ and $y$ positional errors, or automatic actuator means coupled with the means for moving the stator element in the $x$ and $y$ directions.

As previously indicated, a presently preferred embodiment of the invention utilizes the master element as a rotor and the blank element as a stator, and has the carrier signal applied to the blank stator element. Thus, the apparatus of this preferred embodiment includes means for holding a rotor element eccentrically with respect to its axis of rotation, means for rotating it, and means for holding and moving the blank stator element in the x and y directions.

More specifically, the electrical means for detecting the eccentricity error signal includes demodulator means, for obtaining the intermediate signal which varies once per position increment of the transducer, and which may include the once-per-revolution error signal, and rectifying and filtering means, to further demodulate the intermediate signal and obtain only the error signal. In the preferred embodiment, a single system clock is used to generate the carrier frequency, to generate the sampling pulses used to resolve the error signal into $x$ and $y$ components, and to generate a reference signal employed to lock the rotor speed to its predetermined value.

The rotor speed is accurately controlled by control means which, in addition to the clock-generated reference signal, receives pulses indicative of the actual rotor speed, generated by a rotor speed sensor. Since the speed of the rotor is controlled by the system clock, the rotor's angular position at any instant can be readily determined.

In the presently preferred embodiment, the angular position of the point of maximum rotor eccentricity, i.e., the angular position of the rotor center, is detected by a position marker in conjunction with a position sensor aligned with some reference point, such as the positive $x$ axis. Thus, each time the marker passes through the positive $x$ axis the angular position of the point of maximum rotor eccentricity, i.e., the angular position of the rotor center, is determined, and its angular position thereafter can be determined by use of the system clock. Since the position marker may not be exactly in coincidence with the point of maximum rotor eccentricity, means are provided for correcting such an error electronically.

The eccentricity signal component will have a maximum value when the eccentricity of the rotor is exactly angularly aligned with the eccentricity of the stator, since this is the position in which the two elements are most nearly in their intended relationship. Conversely, the eccentricity component of the signal will have a minimum value when the eccentricities of the stator and rotor are 180° out of alignment, since this is the relative position of least alignment between the two elements.

The apparatus of the preferred embodiment of the invention includes means for generating sampling pulses at times corresponding to the transistion of the point of maximum rotor eccentricity through the $x$ and $y$ axes. If the eccentricity component of the signal is sinusoidal, as is practically the case here, samples of its value taken at these ninety-degree intervals will resolve the amplitude of the eccentricity component along the $x$ and $y$ axes, these being the values for application to the $x$- and $y$-axis display means or to the $x$- and $y$-axis automatic actuator means.

It will be apparent from the foregoing that the present invention represents a most significant advance over tecniques available heretofore for center-drilling angular position transducer elements. In particular, the present invention has the ability to continuously generate error signals indicative of the $x$ and $y$ components of eccentricity of a blank element to be bored, so that the electrical center of the blank can be quickly and conveniently located for boring. Other aspects and advantages of the invention will become apparent from the following more detailed description taken in conjunction with the accompanying drawings.

BRIEF DESCRIPTION OF THE DRAWINGS

FIGS. 4a–4e depict typical signal waveforms at various points in the block diagram of FIG. 2.

DETAILED DESCRIPTION

As will be apparent from the drawings, the present invention is concerned with a novel method and apparatus for locating the electrical center of one element of an angular position transducer, so that the element can be quickly and conveniently bored at this position. The electrical center is that point about which a symmetrical array of conductive strips on a transducer element should be rotated for minimum electrical error due to eccentricity of the array. The electrical center may not always correspond exactly to the optical or geometric center of the array, because of possible variations in the size or spacing of the conductive strips. Eccentricity of the transducer elements can significantly affect their accuracy, since they operate on the principle that a signal transferred from one element to the other, usually by induction, will vary periodically as one element is rotated through angular increments with respect to the other. Eccentricity of the elements can cause unwanted signal variations in addition to the periodic variations by which relative angular position is measured. Optical techniques have been widely used in the past to find the center of such transducer elements, but, as already indicated, the optical center of an element does not necessarily coincide with the electrical center.

Figure 1:
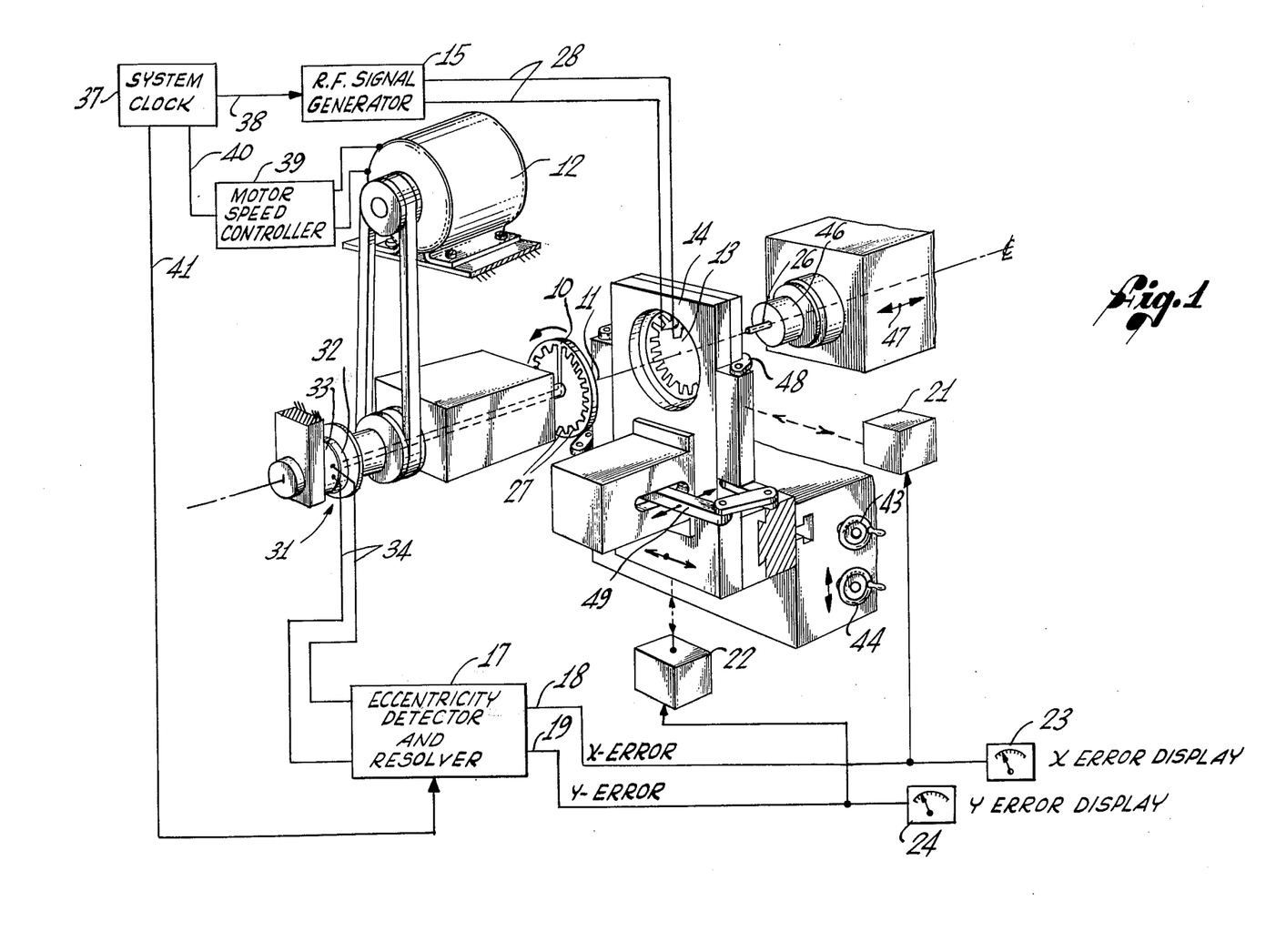
FIG. 1 is a combined perspective and diagrammatic view, showing the principal elements of the apparatus of the present invention.

In accordance with the method of the present invention, and as shown generally in FIG. 1, a master rotor 10 is rotated on an axis 11 at a predetermined speed by a motor 12 and appropriate gearing, and a blank stator 13 to be bored is mounted in a movable holder 14 in an operative position with respect to the rotor, and is supplied with a carrier signal from a radio-frequency signal generator 15. A corresponding signal is induced in the rotor 10 and is analyzed in error detection and resolution circuitry 17, to produce signals indicative of horizontal and vertical components of the eccentricity of the stator 13 with respect to the axis of rotation 11 of the rotor 10.

The stator holder 14 is movable in a horizontal ($x$) direction and a vertical ($y$) direction, and the x and y error signals output from the error detection and resolution circuitry 17 on lines 18 and 19 may be applied directly to actuators 21 and 22, respectively, designed to move the stator holder in the $x$ and $y$ directions until the error signals are reduced to zero. Alternatively, the $x$ and $y$ error signals may be applied to display devices, such as meters 23 and 24, and an operator would then move the stator holder 14 until zero indicators of eccentricity error were displayed. In either case, once the stator 13 is positioned at a point of zero eccentricity, a boring tool 26 mounted for movement along the axis of rotation 11 of the rotor 10, is then moved in toward the stator to bore the required central hole therein.

The present invention is applicable to the manufacture of angular position transducers of various types, but an element of one common type takes the form of the rotor 10 and stator 13 shown in FIG. 1. The transducer element, either rotor 10 or stator 13, comprises a flat disk of electrically insulting material, with a plurality of radial conducting strips 27 uniformly spaced around an annular region of one side of the disk, the strips being electrically connected in series to form a continuous winding. The strips 27 and their interconnections are typically formed by a photoetching or similar process, and their number depends on the angular resolution desired for the complete transducer. In normal use, the rotor and stator elements 10 and 13 are aligned on the same axis for relative rotation, and one of the elements is supplied with a radio-frequency signal. The signal induced in the other of the elements will have an amplitude dependent on the relative angular position of the strips 27 of the two elements, i.e., relative rotation will cause one complete cycle of amplitude variation in the induced signal for each incremental angular position change. Electrical analysis of the induced signal can, therefore, yield the relative angular position to a resolution dependent on the number of conductive strips 27 on the transducer elements 10 and 13.

With the foregoing description of the transducer elements in mind, it should be readily apparent that the radio-frequency signal generator 15 (FIG. 1) can be connected directly to the stator by line 28, but that connection has to be made with a rotating winding in order to obtain the signal induced in the rotor 10. While slip-rings and brush contacts can be used for this purpose without departing from the present invention, these may cause electrical noise which might distort any error signal due to eccentricity. Accordingly, in the presently preferred embodiment of the invention, the rotor 10 is connected to a rotary transformer 31, which has a rotatable winding 32 electrically connected to the rotor, and a stationary winding 33 connected by line 34 to the error detection and resolution circuitry 17.

Because rotary transformers are well known in the computer peripheral and video recording arts, the one employed in the present invention is not illustrated in detail. Typically, the windings 32 and 33 are wound on separate halves of a central core separated by an air gap. The windings 32 and 33 are coupled by a magnetic circuit comprising the central core and the end and side walls of two halves of cylinder surrounding the windings. Although there is a small air gap in the magnetic circuit, the signal induced in the rotor 10 is transferred from winding 32 to winding 33 of the rotary transformer 31 without substantial loss, and with no detectable distortion.

As will become apparent from the description which follows, it is significant that the apparatus of the present invention employs a single system clock 37 (FIG. 1) for synchronization purposes. The clock 37 is connected to the radio-frequency signal generator 15, by line 38, to a motor speed controller 39, by line 40, and to the eccentricity error detection and resolution circuitry 17, by line 41. Thus, the carrier signal generation, the error detection and resolution, and the speed of the rotor 10, are all timed by the same clock 37.

Figure 3:
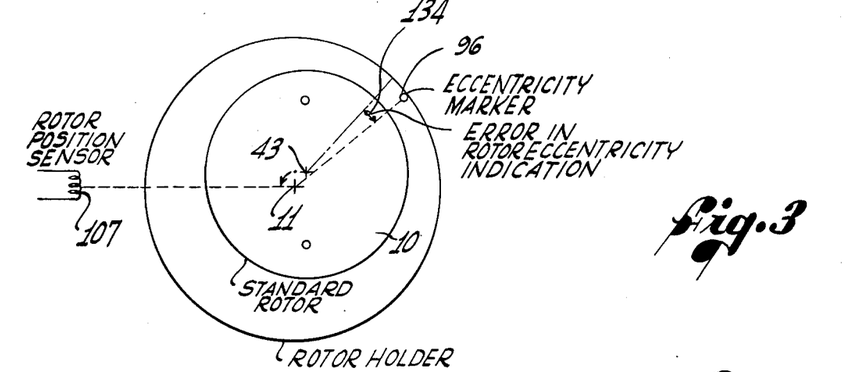
FIG. 3 is a simplified view of a rotor and rotor holder of the apparatus of FIG. 1, taken along the axis of rotation of the rotor holder.

A most important aspect of the invention not shown in FIG. 1, but illustrated specifically in FIG. 3, is that the rotor 10 is rotated with its electrical center, indicated at 43 eccentric with respect to the axis of rotation. The reason for this is that eccentricity of just one of the pair of rotor and stator elements will have no significant effect on the signal induced by one in the other. For example, if the rotor 10 were prefectly concentric with the axis of rotation 11, but the stator 13 were not, the eccentricity of the stator would affect each portion of the rotor winding in succession, but it would affect each portion equally, and there would be no net effect on the series-connected rotor winding. There would, of course, be a diminution in the induced signal because of such a stator eccentricity, but there would be no once-per-revolution signal component indicative of the stator eccentricity. However, with the rotor 10 also eccentric with respect to its axis of rotation 11, a once-per-revolution signal component is introduced in the induced rotor signal. The maximum magnitude of the once-per-revolution component is directly proportional to the eccentricity of the stator 13 with respect to the axis of rotation 11 of the rotor 10, and the instantaneous magnitude will vary approximately sinusoidally according to the relative angular position of the eccentricities of the rotor and stator.

By way of review of the general approach of the invention as thusfar described, a radio-frequency carrier signal is applied to the stator 13 to be bored, is induced in a constant speed rotor 10, and is modulated by what might be called the position terms, i.e., the cyclic amplitude changes caused by the variations in electromagnetic coupling between the stator and rotor as the latter rotates. The induced signal is further modulated by a once-per-revolution component due only to the eccentricity of the stator 13 with respect to the axis of rotation 11. The eccentricity error detector and resolver 17, as will be hereinafter described in greater detail in connection with FIG. 2, operates to extract the once-per-revolution component from the induced rotor signal, and to resolve it into two orthogonal components for application to the x and y actuators 21 and 22, or to the *x* and *y* indicators 23 and 24.

Mechanical aspects of the boring apparatus are not believed to be critical to the invention and are not, therefore, described herein in great detail. For example, and as shown diagrammatically in FIG. 1, the stator holder 14 is mounted for movement in the *x* and *y* directions, i.e., in a plane perpendicular to the axis of rotation 11, by means well known in the machine tool art, such means typically including manual controls 43 and 44 for directing movements in the *x* and *y* directions, respectively. The boring tool 26 is conventionally mounted on a driven spindle 46 movable along the axis 11 as shown by the arrows 47, and the stator holder 14 ideally includes some form of quick-release stator clamping mechanism 48 actuated pneumatically or hydraulically through an appropriate linkage 49.

Figure 2:
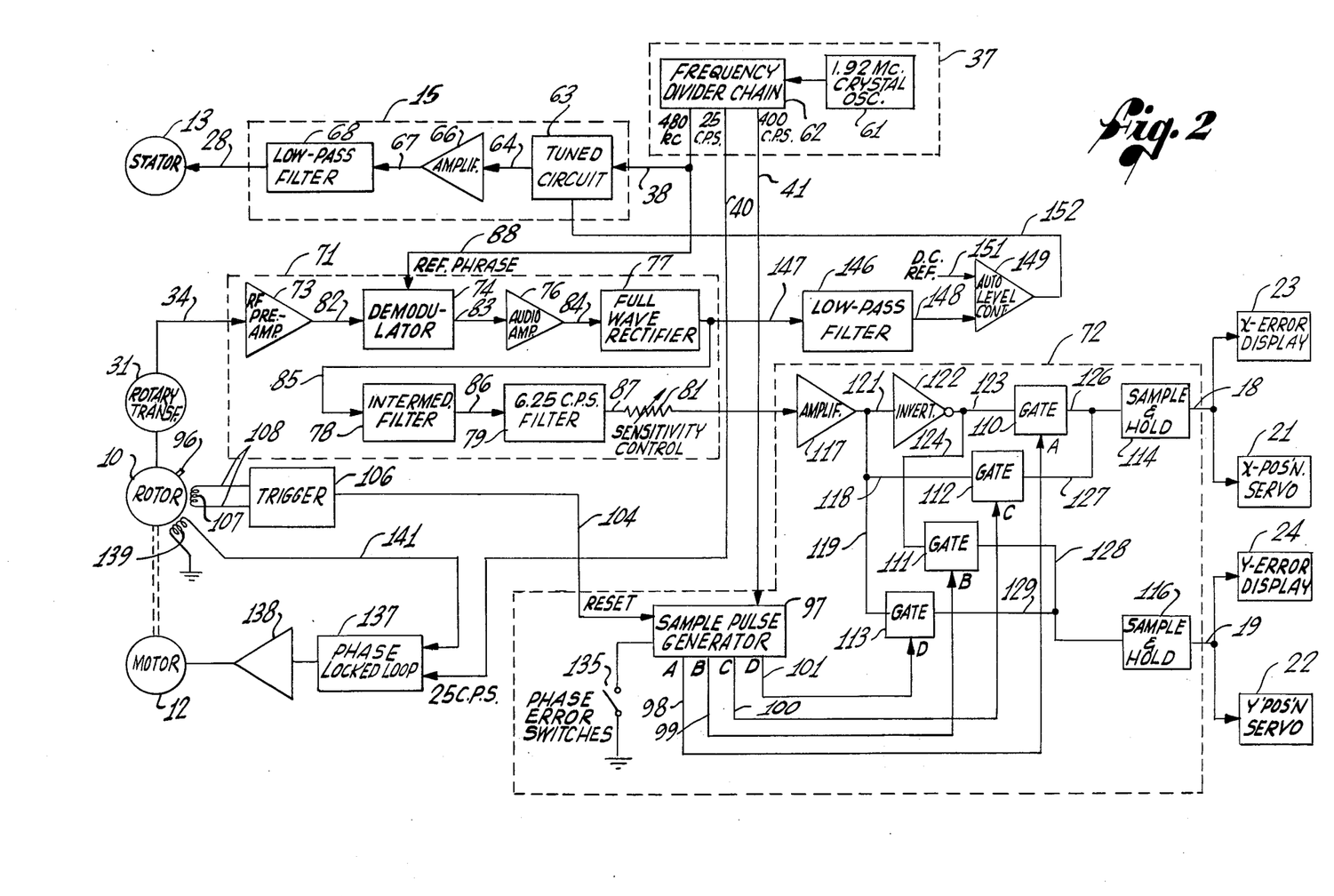
FIG. 2 is an electrical system block diagram of the apparatus shown in FIG. 1.

FIG. 2 includes in block diagram form the basic structure of the error detection and resolution circuitry 17 (FIG. 1) of the present invention. As already mentioned, a single system clock 37 is employed to synchronize various operations. In the illustrative embodiment, the clock 37 includes a crystal oscillator 61 operating at a frequency of 1.92 megacycles per second, and a frequency divider chain 62 of conventional digital design, generating output pulses at 480 kilocycles per second on line 38, 400 cycles per second on line 41, and 25 cycles per second on line 40. It will be understood, of course, that the actual frequency values used are not critical to the invention.

Each of the blocks appearing in FIG. 2, such as the frequency divider chain 62, is of conventional design, and is believed to be within the skill of an ordinary electronics engineer or technician. However, more detailed circuitry which may be used to practice the invention is fully disclosed in FIGS. 5–12, and is discussed generally later in this description.

The 480-kilocycle clock pulses are connected to the radio-frequency signal generator 15 over line 38, and then to the stator 13 over line 28. The radio-frequency signal generator 15 is of conventional design, including a tuned circuit 63 which receives square-wave 480-kilocycle pulses on line 38 and generates a basically sinusoidal output on line 64 at the same fundamental frequency. The output on line 64 is amplified by amplifier 66, and transmitted over line 67 to a low-pass filter 68 which removes residual harmonic frequencies from the output before transmission to the stator 13 over line 28.

The radio-frequency signal induced in the rotor 10 is, as has been described, transmitted to the error detection and resolution circuitry 17 (FIG. 1) through the rotary transformer 31. The error detection and resolution circuitry shown in FIG. 2 may be further broken down into an error detection portion, shown by the dotted envelope 71, and an error resolution portion, shown by the dotted envelope 72.

Figure 4:
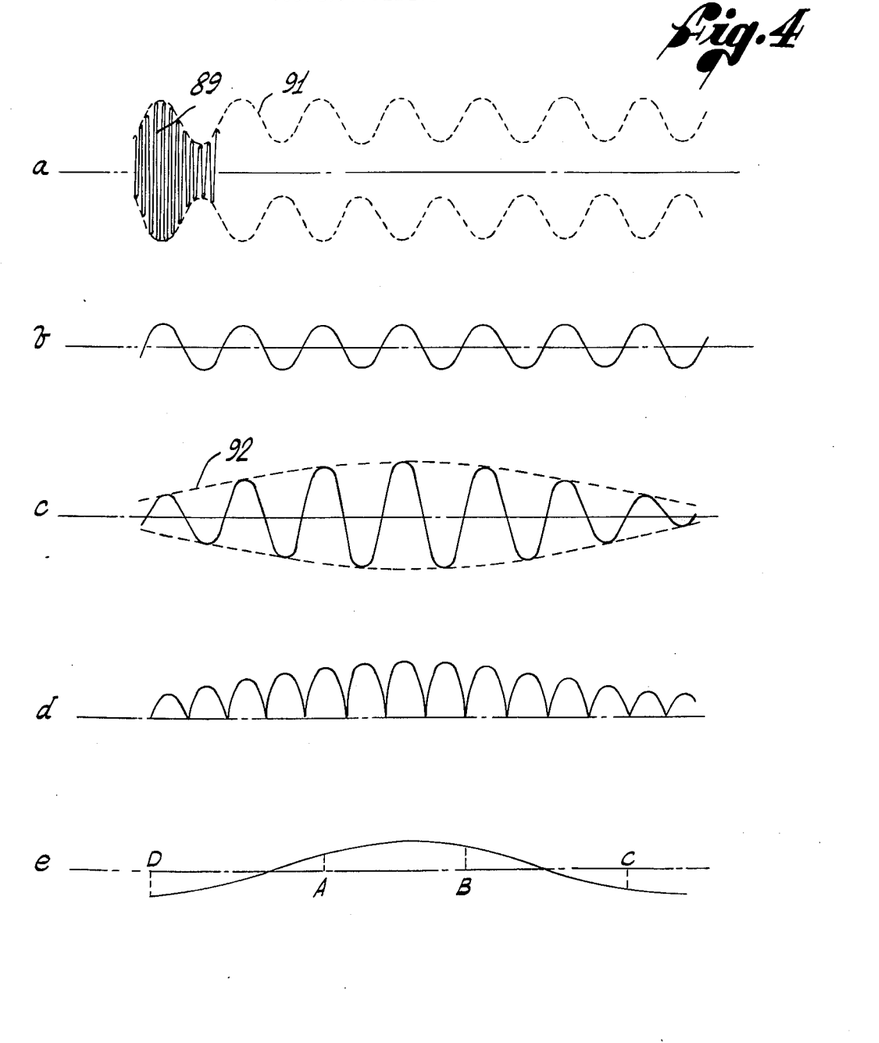

The error detection circuitry 71 includes a radio-frequency amplifier 73, which is connected with the rotary transformer 31 by lines 34, a demodulator 74, an audio-frequency amplifier 76, a full-wave rectifier 77, an intermediate filter 78, a tuned filter 79, and a sensitivity control 81, all of these components being connected in series in the sequence in which they have been mentioned, by lines 82–87, respectively. The radio-frequency amplifier 73 is physically located as close as possible to the rotor 10, since the induced signal is relatively weak. The amplified signal output from the radio-frequency amplifier 73 is transmitted over line 82 the demodulator 74, which removes the radio-frequency components, leaving only the signal variations due to the angular position changes of the rotor 10, and to any possible once-per-revolution effect of stator eccentricity. The demodulator 74 derives a reference carrier signal from the system clock 37, and this is transmitted to the demodulator over line 88. If the eccentricity component is neglected, for purposes of illustration, the signal input to the demodulator 74 over line 82 may be represented by the curve of FIG. 4(*a*), i.e., it comprises a carrier signal 89 amplitude-modulated by a sine wave 91. The signal output from the demodulator 74 over line 83 may be represented by the curve of FIG. 4(*b*), which is merely a sine wave. It will be appreciated, of course, that FIG. 4 is distorted in scale for purposes of illustration. The frequency of the carrier signal 89 will, in fact, be some hundreds of times greater than the frequency due to the incremental angular position changes.

If it is now assumed that there is an error signal component due to the eccentricity of the stator 13, the demodulated signal appearing on line 83 will be similar to the one shown in FIG. 4(*c*), i.e., the sinusoidal signal due to the angular positional variations will itself be amplitude modulated by a once-per-revolution eccentricity component 92. Again, it will be appreciated that the time scale of FIG. 4(*c*) has been distorted for purposes of illustration, since there will typically be a hundred or more angular positional increments per revolution of the rotor 10, rather than the much smaller number shown in the figure.

The output of the demodulator 74 is connected to the audio-frequency amplifier 76 by line 83. The signal at this point is basically as shown in FIG. 4(*c*), and, since the rotor 10 is being turned at 6.25 revolutions per second and the number of incremental variations per revolution is normally around one hundred or more, the resultant signal frequency, after demodulation, will be in the audio range.

After audio amplification, the signal must be demodulated once more, to remove the "position terms" due to the incremental angular position changes. This second demodulation is effected by the full-wave rectifier 77, which receives the audio-amplified signal over line 84, and produces as its output, on line 85, a rectified but unfiltered signal, as shown in FIG. 4(*d*).

The output on line 85 from the rectifier 77 is connected to the intermediate filter 78, which removes most of the harmonic content of the output. The intermediate filter 78 is coupled, in turn, over line 86 to the tuned filter 79, which allows only the once-per-revolution eccentricity component 92 (FIG. 4(*c*)) to pass. The filter 79 is tuned to exactly the frequency at which the rotor 10 is turning, in this case 6.25 cycles per second. All other frequencies, including the constant or d.c. component, are removed, and the output on line 87 from the tuned filter 79 will be symmetrical about a zero-reference axis, as shown in FIG. 4(*e*).

The remaining component of the error detection circuitry 71 is the sensitivity control 81, which is essentially a series-connected variable resistor in the line 87. Up to this point, the eccentricity error signal, shown in FIG. 4(*e*), has been detected and isolated, but it has still to be converted into a form useful for the control of the stator position so as to eliminate the eccentricity error entirely. This step is accomplished by the resolution circuitry 72 which will now be described in detail.

The rotor 10 has associated with it an angular position marker 96, best shown in FIG. 3, which signifies the angular position of the point of maximum eccentricity of the rotor 10. The function of the error resolution circuitry 72 is to sample the eccentricity signal component, illustrated in FIG. 4(e), at four points spaced by 90° and designated A, B, C, and D, respectively. The sample A is to be taken when the point of maximum rotor eccentricity passes through the positive $x$ axis, the sample B at the positive $y$ axis, the sample C at the negative $x$ axis, and the sample D at the negative $y$ axis. It will be recalled that the stator 13 is movable in the $x$ and $y$ axes, which are orthogonal axes in a plane perpendicular to the axis of rotation 11.

It should be readily apparent from FIG. 4(e) that, if the angular position of the stator eccentricity with respect to the positive $x$ axis is designated $\theta$, where $\theta$ is measured, as is conventional, in a counterclockwise direction from the positive $x$ axis, and if E is the maximum amplitude of the sinusoidal eccentricity error component plotted in FIG. 4(e), then the samples A through D will have values $E \cos \theta$, $E \sin \theta$, $-E \cos \theta$, and $-E \sin \theta$, respectively. Clearly, the $x$-axis component of the eccentricity error can be obtained from sample A or sample C, and the $y$-axis component can be obtained from sample B or sample D.

In the illustrative embodiment, sampling pulses for samples A through D are generated by a sample pulse generator 97 on output lines 98–101, respectively. The sample pulse generator 97 basically comprises a counter (not shown in FIG. 2), which receives and counts pulses at 400 cycles per second over line 41 from the frequency divider chain 62 of the system clock 37, and a decoder (not shown to generate the requisite sampling pulses when the counter reaches values corresponding to 90° intervals. The sample pulse generator 97 has its counter reset by a signal on line 104. This latter signal is generated by a trigger circuit 106 in response to a weaker signal which is generated by a rotor position sensor 107 as the rotor position marker 96 passes the sensor, and transmitted to the trigger circuit over lines 108.

Thus, in normal operation, as the point of maximum rotor eccentricity passes through the positive x axis, a reset pulse on line 104 resets the sample pulse generator 97 to zero. This causes the immediate generation of sample pulse A on line 98, and the sample pulse generator 97 then counts off the appropriate number of pulses until the generation of the subsequent B, C and D pulses. The lines 98–101 are connected to four corresponding gate circuits 110–113, specifically the A gate 110, B gate 111, C gate 112 and D gate 113. These gates, in conjunction with two sample-and-hold circuits 114 and 116, perform the sampling of the eccentricity error signal at the appropriate times.

The detected and isolated eccentricity error signal, on line 87, is further amplified by another amplifier 117, and is then input to the C and D gates 112 and 113 over lines 118 and 119, respectively, and is also connected, by line 121, to an inverter 122, the output of which is connected to the A and B gates 110 and 111 over lines 123 and 124, respectively. The outputs from the A and C gates 110 and 112 are both connected to one sample-and-hold circuit 114, over lines 126 and 127, respectively, and the outputs from the B and D gates 111 and 113 are both connected to the other sample-and-hold circuit 116, over lines 128 and 129, respectively. Thus, the first sample-and-hold circuit 114 is activated by sample pulses A and C, and holds a value equivalent to the $x$-axis component of eccentricity error. Actually, because of the presence of the inverter 122, and the connections of the A and C gate circuits 110 and 112, the value in the first sample-and-hold circuit 114 is the $x$-axis eccentricity correction, rather than the error, and it can be applied directly to an $x$-axis position servomechanism or actuator 21, which will operate automatically to position the stator 13 in the $x$ axis until the $x$-axis error is zero. Similarly, the second sample-and-hold circuit 16 holds the $y$-axis component of the eccentricity correction, which can be fed directly to a $y$-axis position servomechanism or actuator 22.

The sample-and-hold circuits 114 and 116 may also be connected to the respective error display devices 23 and 24. These may be conventional meters, or may, as in one preferred embodiment illustrated in FIG. 12, take the form of a row of indicator lights. The display device of FIG. 12 includes a voltage divider 131, a plurality of voltage comparators 132, and an equal plurality of display elements 133, such as light-emitting diodes (LED's). The voltage divider 131 is grounded at its center point, and has equal voltages of opposite polarity applied to its ends. Intermediate voltages of both polarities are tapped off from the voltage divider and applied to one terminal of each of the voltage comparators 132. The error signal for the $x$ or $y$ axis, indicated as 18 or 19, is connected to the other terminal of each comparator 132, and the comparator outputs are connected to the respective LED's 133. When the error voltage is at zero or ground potential, all of the comparators 132 will generate an output, and all of the LED's will be illuminated, indicating zero eccentricity. But if an error voltage is present, some of the LED's 133 will not be energized, and an operator will have to move the stator 13 (FIG. 1) in the appropriate direction until all of the LED's are illuminated.

In the preceeding discussion of the sample pulse generator 97 (FIG. 2), it was assumed that the rotor position marker 96 was accurately positioned in coincidence with the point of maximum eccentricity of the rotor 10. To avoid the manufacturing precision that this might entail, the preferred embodiment includes means for correcting any discrepancy between the marker 96 and the actual point of maximum rotor eccentricity. It should be apparent that the correction can be made by arranging that the reset pulse on line 104 operates to reset the count in the sample pulse generator 97 not to zero, but to some other value representative of an angular difference between the position of the marker 96 and point of maximum rotor eccentricity. This angular error is indicated by the reference numeral 134 in FIG. 3. The sample pulse generator 97 contains commercially available counter logic by means of which the reset pulse can effect the setting of any desired value in the counter, in accordance with the settings of a plurality of grounding switches, shown diagrammatically as a single switch 135 in FIG. 2.

As mentioned earlier, the speed of the motor 12 driving the rotor 10 is accurately controlled by a speed controller 39 which derives a 25 cycle-per-second clock signal from the system clock 37, over line 40. The speed controller 39 basically comprises a phase-locked loop 137 and amplifier circuitry 138. The phase-locked loop 137 receives a motor speed signal from a rotor speed sensor 139, over line 141, and, in conjunction with the amplifier circuitry 138, varies the duty cycle of the field winding of the motor 12, which is supplied with a square-wave field current, to effect appropriate speed changes necessary to maintain a constant motor speed.

One further aspect of the block diagram of FIG. 2 is that the rectified signal output from the rectifier 77 on line 85 is also transmitted to another low-pass filter 146, over line 147, which eliminates all of a.c. components of the signal, including the once-per-revolution component, leaving only an average d.c. level indicative of the average modulating signal induced in the rotor 10. This average level is transmitted over line 148 to an automatic level control circuit 149, which compares the level with a d.c. reference voltage applied on line 151, a resultant difference signal being output over line 152 to the tuned circuit 63. In essence, line 152 completes a feedback path back to the tuned circuit 63, to ensure that the error signal derived from the rotor 10 is a stable one.

As mentioned earlier in this detailed description, much of the circuitry described thusfar, particularly with reference to FIG. 2, may be designed and implemented in a variety of ways, all within the competence of an ordinarily skilled electronics designer. By way of example, the circuits shown in FIGS. 5–12 represent one detailed implementation of the electrical components of the invention. The component values and part numbers are included on the drawings, and no further description is believed to be necessary, except to relate these detailed drawings to the block diagram of FIG. 2. It will be appreciated that any of a variety of particular components and integrated-circuit chips could be utilized in this circuitry, and that the part numbers indicated are only exemplary. The part numbers given for digital and linear integrated-circuit chips, and for the diodes in FIGS. 8 and 9, and standard throughout the industry. With regard to discrete transistor components, the transistors TIP31A and TIP32A in FIG. 11 are manufactured by Texas Instruments Incorporated, Dallas, Texas, and the field effect transistors in FIGS. 6 and 10 may be of any suitable design, for example, part number 2N5018 manufactured by Teledyne Semiconductor, Mountain View, California. The diodes A14F in FIG. 11 are manufactured by General Electric Company, Schenectady, New York. Power supplies relating to FIGS. 5–12 have been omitted for clarity.

Figures 5, 6:
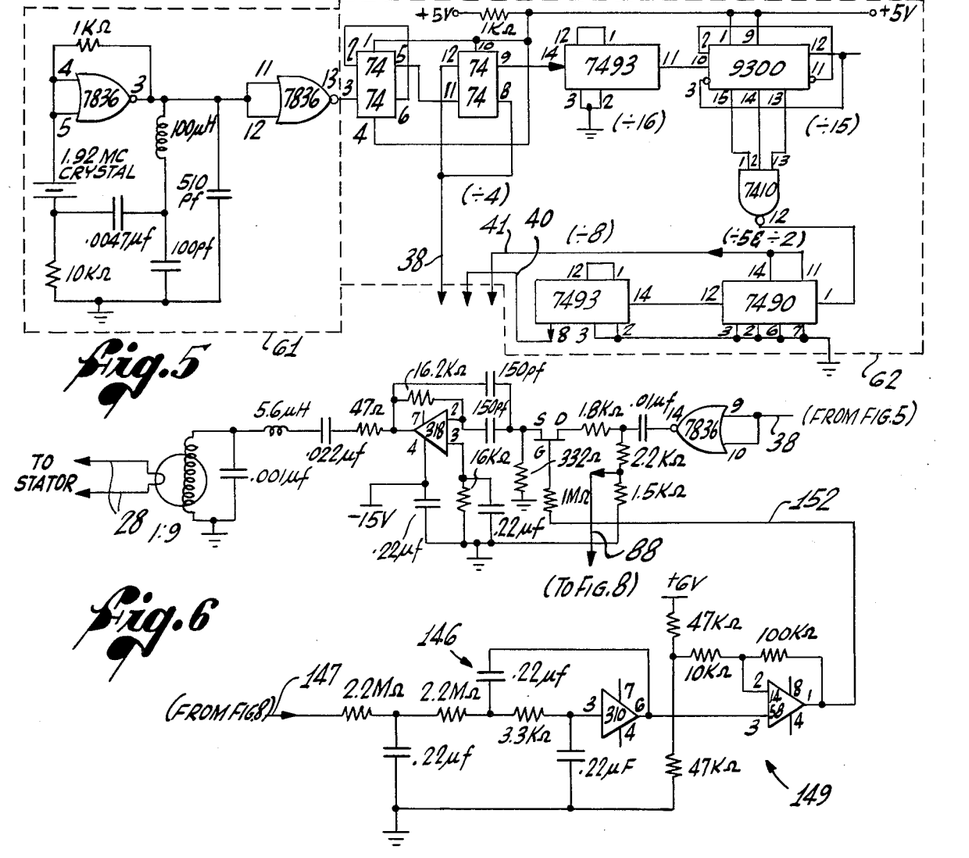
FIGS. 5–12 together comprise detailed schematic diagrams corresponding to the electrical system illustrated in FIG. 2.

FIG. 5 is a detailed schematic diagram of the system clock 37, of which the crystal oscillator 61 and the frequency divider chain 62 are identified by broken lines.

FIG. 6 is a detailed schematic diagram of the radio-frequency signal generator 16 (FIG. 1), together with the automatic level control circuit 149 and its associated low-pass filter 146.

Figure 7:
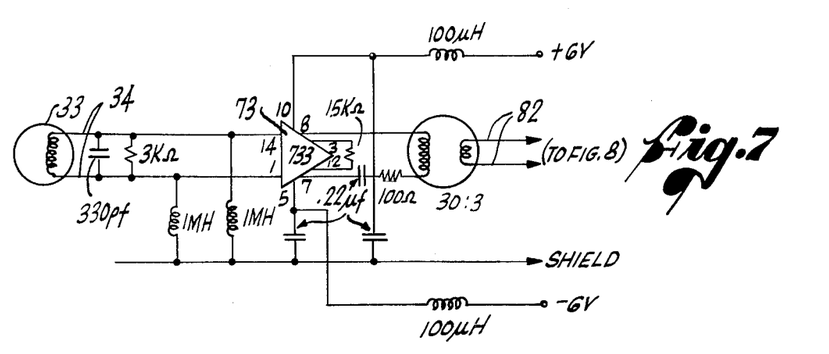
Figure 8:
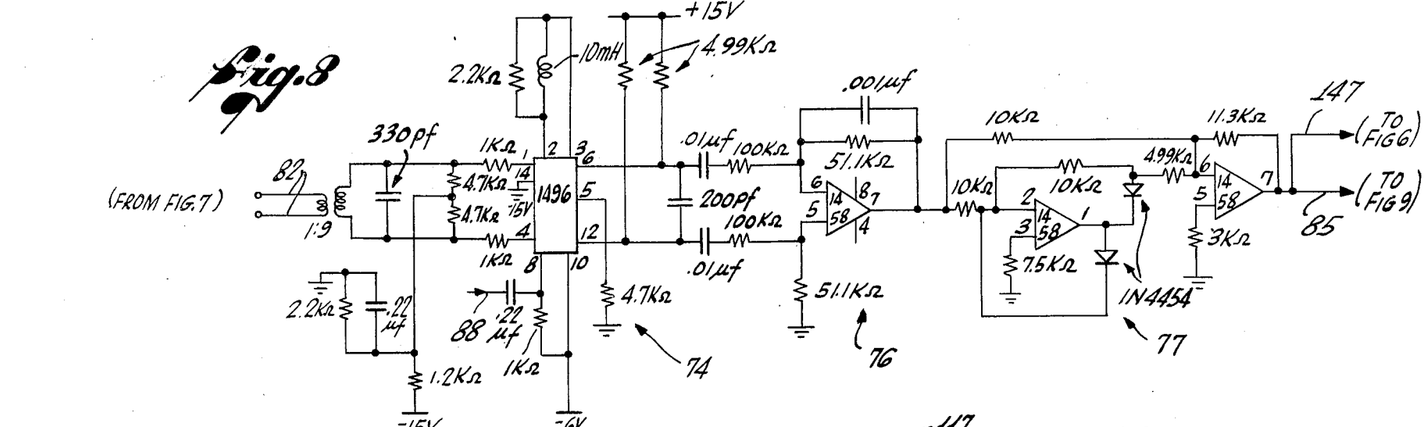
Figure 9:
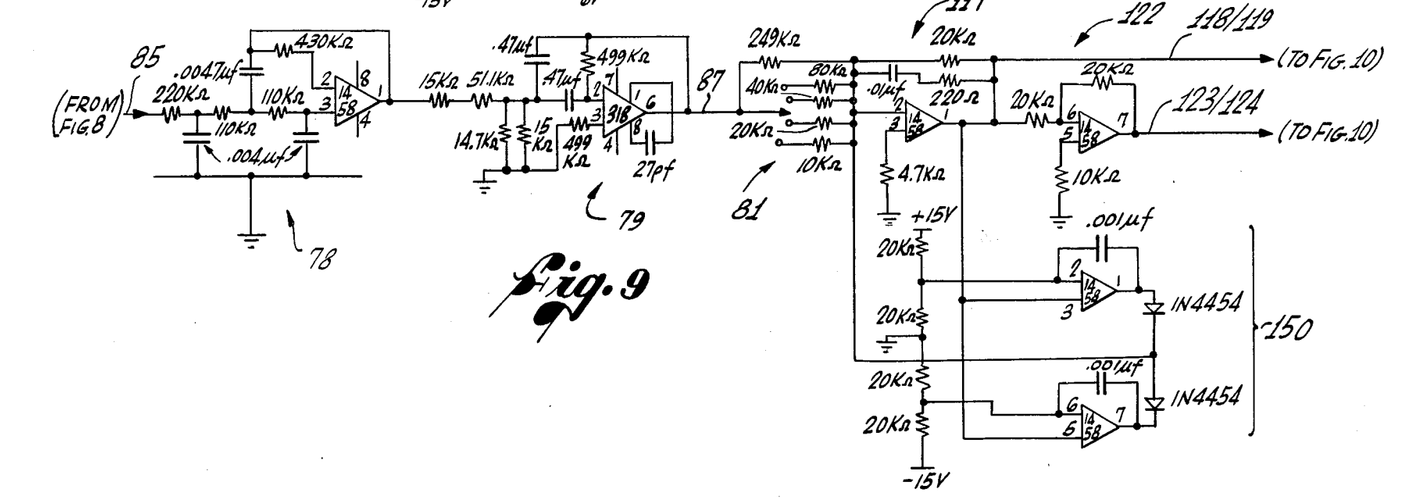

FIG. 7 details the circuitry of the radio-frequency amplifier 73. FIG. 8 provides the detailed circuitry of the demodulator 74, the audio amplifier 76, and the full-wave rectifier 77. FIG. 9 continues the error detection circuitry with exemplary details of the intermediate filter 78, the tuned filter 79, and the sensitivity control 81, together with the amplifier 117 and inverter 122. Also included in FIG. 9 is a clipping circuit 150 designed to limit the error signal to a selected maximum magnitude. Otherwise overloading the amplifier 117 can cause a false output signal.

Figure 10:
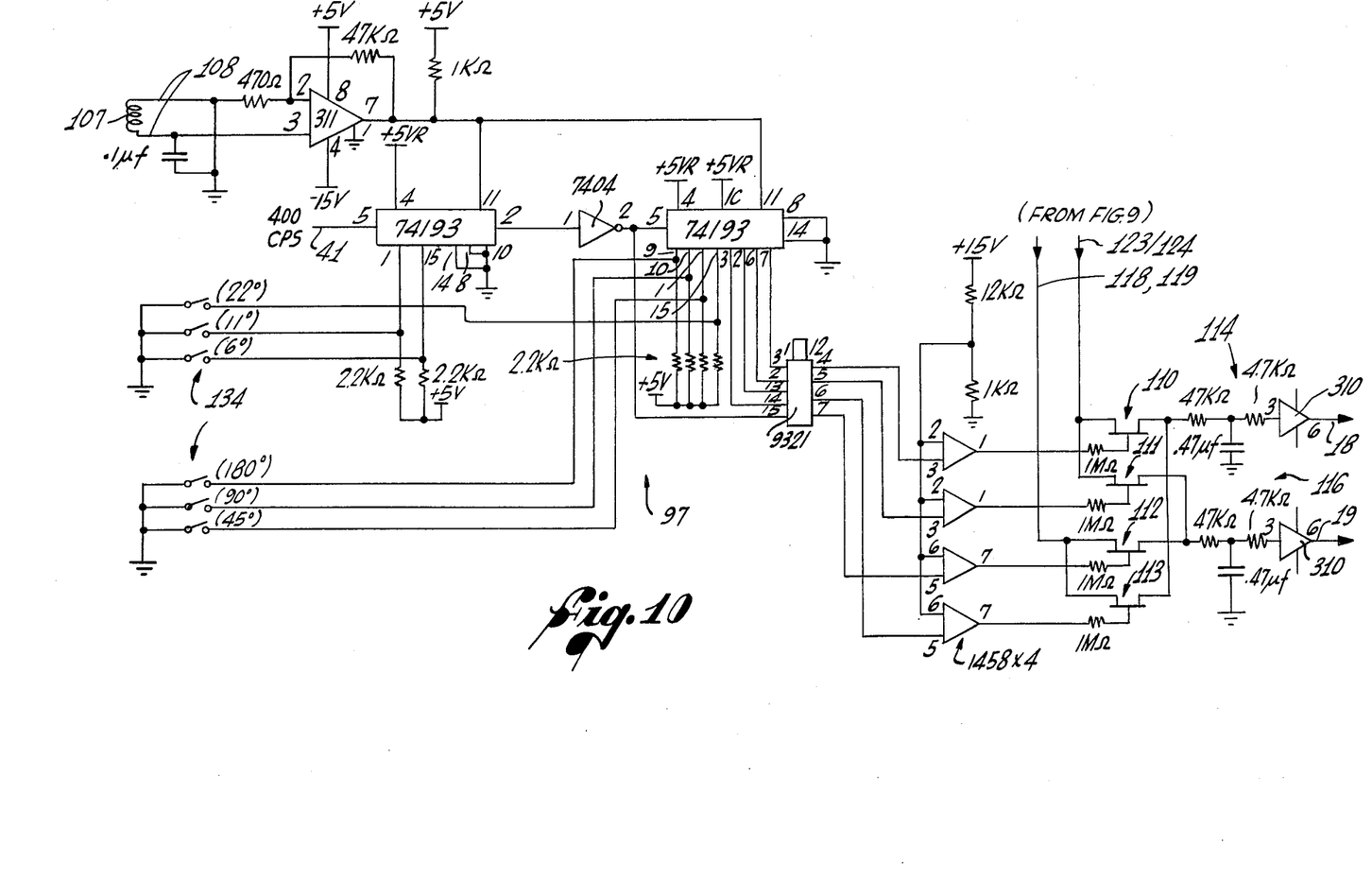
Figure 11:
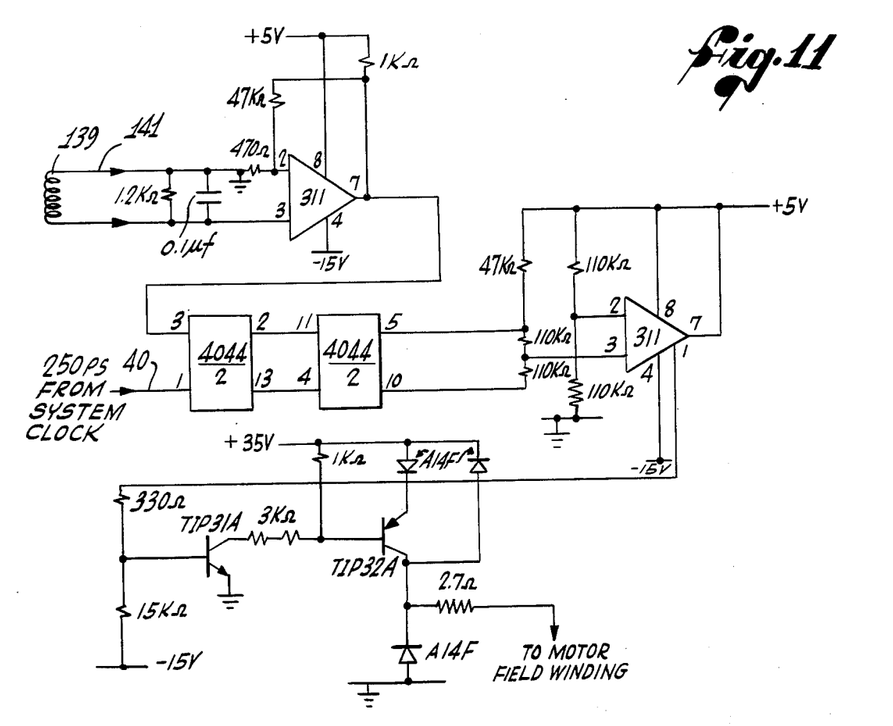
Figure 12:
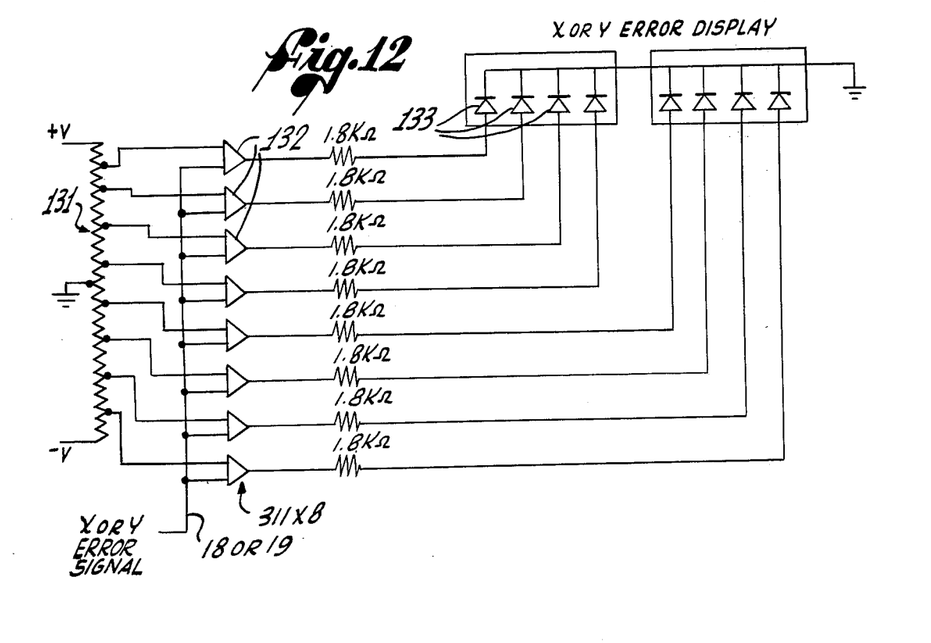

FIG. 10 includes details of the sample pulse generator 97, together with the related trigger circuit 106, gates 110–113 and sample-and-hold circuits 114 and 116. Finally, FIG. 11 provides the details of construction of the motor speed controller 39 (FIG. 1), and FIG. 12 is, as has been described, an example of an error display device that could be utilized with the invention.

It will be appreciated from the foregoing that the present invention represents a significant advance over previously available techniques for boring angular position transducer elements at their centers. Specifically, the apparatus of the present invention is operative to produce error signals, practically continuously, indicative of the $x$ and $y$ components of stator eccentricity. The stator blank can then be readily moved until the error components are reduced to zero, and the blank bored at its electrical center.

Although a particular embodiment of the invention has been described in detail, and detailed schematics for a particular implementation have been provided, it will be appreciated that various modifications may be made without departing from the spirit and scope of the invention. Accordingly, the invention is not to be limited, except as by the appended claims.

We claim:

1. A method of generating a signal indicative of the eccentricity of an angular position transducer element, comprising the steps of:
   placing a blank transducer element in an operative relationship with a master transducer element;
   rotating one of the transducer elements with respect to the other about an axis of relative rotation, the master element being deliberately eccentric with respect to the axis of relation rotation;
   energizing one of the transducer elements and thereby inducing a corresponding signal in the other; and
   processing the induced signal to derive therefrom an error signal indicative of the eccentricity of the blank element with respect to the axis of relative rotation.

2. A method as set forth in claim 1, wherein:
   said rotating step is effected by rotating the master transducer element with respect to the blank transducer element; and
   said energizing step is effected by energizing the blank transducer element and thereby inducing a corresponding signal in the rotating master element.

3. A method as set for in claim 2, wherein:
   said energizing steps is effected by applying a radio-frequency carrier signal to one of the elements; and
   said processing step includes the steps of
      demodulating the induced signal to remove the carrier signal and leave an intermediate signal having a position-related component with an amplitude depending on angular position and an eccentricity error component with an amplitude varying over a once-per-revolution cycle; and
      rectifying and filtering the intermediate signal, to derive therefrom the eccentricity error component.

4. A method as set forth in claim 1, and further including the step of resolving the error signal into orthogonally related components.

5. A method as set forth in claim 4, wherein said resolving step includes the steps of:

sampling the eccentricity error component at preselected points in its complete cycle, the preselected points corresponding to times at which the center of the master element passes through two orthogonally related axes; and holding the valves obtained by said sampling step, for display and utilization in said moving step.

6. A method of locating the center of an angular position transducer element for subsequent boring, comprising the steps of:

placing a blank transducer element to be bored in an operative relationship with a master transducer element;

rotating one of the transducer elements with respect to the other at a constant speed about an axis of relative rotation, the master element being deliberately eccentric with respect to the axis of relative rotation;

energizing one of the transducer elements and thereby inducing a corresponding signal in the other;

processing the induced signal to derive therefrom an error signal indicative of the eccentricity of the blank element with respect to the axis of relative rotation;

resolving the error signal into orthogonally related components; and moving the blank element in a plane perpendicular to the axis of relative rotation until the resolved components of the error signal are both zero and the blank element is therefore concentric with the axis of relative rotation.

7. A method as set forth in claim 6, wherein:

said rotating step is effected by rotating the master transducer element with respect to the blank transducer element; and said energizing step is effected by energizing the blank transducer element and thereby inducing a corresponding signal in the rotating master element.

8. A method as set forth in claim 7, wherein:

said energizing step is effected by applying a radio-frequency carrier signal to one of the elements; and said processing step includes the steps of demodulating the induced signal to remove the carrier signal and leave an intermediate signal having a position-related component with an amplitude depending on angular position and an eccentricity error component with an amplitude varying over a once-per-revolution cycle; and rectifying and filtering the intermediate signal, to derive therefrom the eccentricity error component.

9. A method as set forth in claim 8, wherein said resolving step includes the steps of:

sampling the eccentricity error component at preselected points in its complete cycle, the preselected points correspoinding to times at which the center of the master element passes through two orthogonally related axes; and holding the values obtained by said sampling step, for display and utilization in said moving step.

10. A method of boring an accurate center-hole in an angular position transducer element, comprising the steps of:

rotating a master rotor element at a constant speed about an axis of rotation having significant eccentricity with respect to the center of the rotor element;

holding a blank stator element to be bored in an operative relationship with the rotor element;

energizing the stator element with a radio-frequency signal, and thereby inducing a corresponding signal in the rotor element;

demodulating the signal induced in the rotor element, to obtain an intermediate signal having a position-related component with amplitude variations due to incremental changes in angular position of the rotor, and having an eccentricity error signal component with an amplitude cycle corresponding to each revolution of the rotor;

rectifying and filtering the intermediate signal to obtain therefrom the eccentricity error signal component;

resolving the eccentricity error signal component into $x$ and $y$ components by sampling the error signal component at points spaced by ninety-degree intervals and corresponding to times of transition of the center of the rotor element through $x$ and $y$ axes;

displaying the $x$ and $y$ components of the eccentricity error signal;

moving the blank stator element along the $x$ and $y$ axes until the $x$ and $y$ error components are reduced to zero; and boring the blank stator element utilizing means rotatable about the axis or rotation of the rotor element.

11. Apparatus for electrically locating the center of an angular position transducer element for subsequent boring, said apparatus comprising:

means for holding a blank transducer element to be bored and a master transducer element in an operative relationship with each other;

means for rotating one of the transducer elements with respect to the other at a constant speed about an axis of relative rotation, the master transducer element being deliberately eccentric with respect to the axis of rotation;

signal generation means coupled with one of the transducer elements thereby to produce an induced signal in the other;

signal processing means couple to receive the induced signal, for deriving therefrom an eccentricity error signal indicative of any eccentricity of the blank transducer element with respect to the axis of relative rotation;

error signal resolution means for resolving the derived error signal into orthogonally related components; and means for moving the blank transducer element in orthogonally related axes perpendicular to the axis of relative rotation until the resolved components of the error signal are zero and the blank element is therefore concentric with the axis of relative rotation.

12. Apparatus as set forth in claim 11, wherein:

said signal generation means includes means for generating a relatively high-frequency carrier signal, whereby the carrier signal is amplitude modulated by variations in coupling between the transducer elements caused by the relative rotation, and whereby the induced signal includes a carrier-frequency component modulated by a position-indicating signal varying once per angular position increment and further modulated by the eccentricity error signal; and said signal processing means includes
demodulation means for removing the carrier-frequency component, and
rectifying and filtering means for removing the position-indicating signal and isolating the eccentricity error signal.

13. Apparatus as set forth in claim 12, wherein said error signal resolution means includes:
means for sampling the eccentricity error signal at preselected points in its cycle, including means for generating sampling pulses at times when the angular position of the center of the master transducer element coincides with the orthogonally-related axes; and
means for holding sampled values of the eccentricity error signal for display and utilization by said means for moving the blank transducer;
whereby the eccentricity error signal has a maximum instantaneous value when the centers of the transducer elements are angularly aligned, and the sampled values provide a resolution of the eccentricity of the blank transducer element along the two orthogonally related axes.

14. Apparatus as set forth in claim 13, wherein:
said means for rotating one of the transducer elements includes a drive motor and motor speed control means; and
said motor speed control means and said means for generating sampling pulses are coupled with said signal generation means, for accurate synchronization of said apparatus.

15. Apparatus as set forth in claim 11, and further including display means for visibly displaying the resolved components of the eccentricity error signal.

16. Apparatus as set forth in claim 11, wherein said means for moving the blank transducer element includes automatic actuator means coupled with said error signal resolution means, for moving the blank transducer element along the orthogonally related axes in response to non-zero resolved error signal components from said error signal resolution means.

17. Apparatus as set forth in claim 11, and further including boring means movable relative to the blank stator element along the axis of relative rotation, to accurately bore the blank element after location of its center.

18. Apparatus for electrically locating the center of an angular position transducer element for subsequent boring, said apparatus comprising:
means for holding a rotor transducer element with its center deliberately eccentric with respect to an axis of rotation;
means for rotating the rotor element about the axis at a constant speed;
stator holder means for holding a blank stator element, to be bored, in an operative relationship with the rotor element;
signal generation means coupled with the stator element thereby to induce a signal in the rotor element;
signal processing means coupled with the rotor element to receive the induced signal, for deriving therefrom an eccentricity error signal indicative of any eccentricity of the stator element with respect to the axis of rotation;

error signal resolution means for resolving the derived error signal into orthogonally related components; and
means for moving said stator holder means in orthogonally related axes perpendicular to the axis of rotation until the resolved components of the error signal are zero and the stator element is therefore concentric with the axis of rotation.

19. Apparatus as set forth in claim 18, wherein:
said signal generation means includes means for generating a relatively high-frequency carrier signal, whereby the carrier signal is amplitude modulated by variations in coupling between the rotor and stator elements caused by the rotation of the rotor, and whereby the induced signal includes a carrier-frequency component modulated by a position-indicating signal varying once per angular position increment and further modulated by the eccentricity error signal; and said signal processing means includes
demodulation means for removing the carrier-frequency component, and
rectifying and filtering means for removing the position-indicating signal and isolating the eccentricity error signal.

20. Apparatus as set forth in claim 19, wherein said error signal resolution means includes:
means for sampling the eccentricity error signal at preselected points in its cycle, including means for generating sampling pulses at times when the angular position of the center of the rotor element coincides with the orthogonally-related axes; and
means for holding sampled values of the eccentricity error signal for display and utilization by said means for moving said stator holder means;
whereby the eccentricity error signal has a maximum instantaneous value when the centers of the rotor and stator elements are angularly aligned, and the sampled values provide a resolution of the eccentricity of the stator element along the two orthogonally related axes.

21. Apparatus as set forth in claim 20, wherein:
said means for rotating rotor element includes a drive motor and motor speed control means; and
said motor speed control means and said means for generating sampling pulses are both coupled with said signal generation means, for accurate synchronization of said apparatus.

22. Apparatus as set forth in claim 21, wherein said means for generating sampling pulses includes:
pulse counting means coupled to receive pulses from said signal generation means, for timing intervals between the sampling pulses; and
rotor position detection means, including a rotor position marker located on said means for holding the rotor element at an angular position corresponding approximately to the center of the rotor, and sensor means located on one of the orthogonally related axes, for sensing the passing of said position marker;
whereby said rotor position detection means resets said pulse counting means to a predetermined value as said rotor position marker and the center of the rotor pass through one of the axes, and said pulse counting means thereafter generates sampling pulses as the center of the rotor passes through each of the axes.

23. Apparatus as set forth in claim 22, wherein said means for generating sampling pulses further includes manually operable switch means connected with said pulse counting means, for compensating for any error in the location of said rotor position marker; whereby said position marker need not be accurately angularly aligned with the center of the rotor and such inaccuracy can be compensated for by approximate settings of said switch means.

24. Approximately as set forth in claim 18, and further including display means for visibly displaying the resolved components of the eccentricity error signal.

25. Apparatus as set forth in claim 18, wherein said means for moving said stator holder means includes automatic actuator means coupled with said error signal resolution means, for moving the blank stator element along the orthogonally related axes in response to non-zero resolved error signal components from said error signal resolution means.

26. Apparatus as set forth in claim 18, and further including boring means movable along and rotatable about the axis of rotation, for accurately boring the stator element after location of its center.

27. Apparatus for electrically locating and boring the center of an angular position transducer element, said apparatus comprising:
  means for holding a rotor transducer element with its center deliberately eccentric with respect to an axis of rotation;
  means for rotating the rotor element about the axis at a constant speed, including a drive motor and motor speed control means;
  stator holder means for holding a blank stator element in an operative relationship with the rotor element;
  signal generation means, including means for generating a relatively high-frequency carrier signal, said signal generation means being connectable with the stator element to induce a corresponding signal in the rotor element, the induced signal being amplitude-modulated by variations in electrical coupling between the rotor and stator elements caused by rotation of the rotor, whereby the induced signal includes a carrier-frequency component modulated by a position-indicating signal varying once per angular position increment and further modulated by an eccentricity error signal;
  signal processing means for receiving and processing the induced signal, including demodulation means for removing the carrier-frequency component, and rectifying and filtering means for isolating the eccentricity error signal;
  error signal resolution means for resolving the eccentricity error signal into orthogonally related components, said error signal resolution means including means for sampling the eccentricity error signal at preselected points in its cycle, by generating sampling pulses at times when the angular position of the center of the rotor element coincides with orthogonally related axes, and means for holding the sampled values of the eccentricity error signal;
  means for visibly displaying the sampled values of the eccentricity error signal;
  means for moving said stator holder means in the orthogonally related axes until the resolved components of the eccentricity error signal are zero and the stator element is therefore concentric with the axis of rotation of the rotor element; and
  boring means movable along and rotatable about the axis of rotor rotation, for accurately boring the stator element after location of its center.

28. Apparatus as set forth in claim 27, wherein said means for moving said stator holder means includes automatic servo means coupled with said error signal resolution means, for moving the stator element along the orthogonally related axes in response to nonzero resolved error signal components from said error signal resolution means.

29. Apparatus as set forth in claim 27, wherein said means for generating sampling pulses includes:
  pulse counting means coupled to receive pulses from said signal generating means, for timing intervals between the sampling pulses; and
  rotor position detection means, including a rotor position marker located on said means for holding the rotor element at an angular position corresponding approximately to the center of the rotor, and sensor means located on one of the orthogonally related axes, for sensing the passing of said position marker;
  whereby said rotor position detection means resets said pulse counting means to a predetermined value as said rotor position marker and the center of the rotor pass through one of the axes, and said pulse counting means thereafter generates sampling pulses as the center of the rotor passes through each of the axes.

30. Apparatus as set forth in claim 29, wherein said means for generating sampling pulses further includes manually operable switch means connected with said pulse counting means, for compensating for any error in the location of said rotor position marker; whereby said position marker need not be accurately angularly aligned with the center of the rotor and such inaccuracy can be compensated for by appropriate settings of said switch means.

* * * * *